United States Patent [19]

Lee et al.

[11] Patent Number: 5,467,343
[45] Date of Patent: Nov. 14, 1995

[54] METHOD AND DEVICE FOR CONSOLIDATION OF PREFERENTIAL RESOURCE CONSTRAINTS

[75] Inventors: Whay C. Lee, Cambridge; Michael G. Hluchyj, Wellesley, both of Mass.

[73] Assignee: Motorola, Inc., Schuamburg, Ill.

[21] Appl. No.: 281,379

[22] Filed: Jul. 27, 1994

[51] Int. Cl.$^6$ .................................................. H04L 12/54
[52] U.S. Cl. ............................................ 370/54; 340/826
[58] Field of Search ........................... 370/16, 17, 54, 370/60.1, 79, 85.8, 94.2, 119; 455/53.1, 54.2; 340/825.03, 826, 827; 375/377; 371/11.1

[56] References Cited

U.S. PATENT DOCUMENTS

| 5,319,632 | 6/1994 | Iwasaki | 370/16 |
| 5,367,517 | 11/1994 | Cidon et al. | 370/54 |

OTHER PUBLICATIONS

"Integrated Packet Networks with Quality of Service Constraints", Whay C. Lee and Purushottam Kamat, Globecom '91, IEEE, pp. 223–227.

"Rule–Based Call–by–Call Source Routing for Integrated Communication Networks", Whay C. Lee, Michael G. Hluchyj, and Pierre A. Humblet, Infocom '93, IEEE, pp. 987–993.

Primary Examiner—Benedict V. Safourek
Attorney, Agent, or Firm—Darleen J. Stockley

[57] ABSTRACT

A novel resource constraint merge scheme combines the requested and acceptable resource constraint sets for an efficient solution to the problem of consolidating preferential resource constraints. This solution is particularly useful in consolidation of preferential resource constraints in ATM cell relay networks, especially LANs and WANs.

10 Claims, 7 Drawing Sheets

— PRIOR ART —

METHOD AND DEVICE FOR CONSOLIDATION OF PREFERENTIAL RESOURCE CONSTRAINTS

FIELD OF THE INVENTION

The present invention relates to efficient allocation of communication network resources and, more particularly, to efficient combination of resource constraints for achieving preferences for satisfying multiple end-users with diverse quality of service requirements.

BACKGROUND

Communication networks have long evolved from the plain old telephone networks with homogeneous users to the integrated networks of today. The economy of scale for large networks with simple and objective service requirements is gradually giving way to the economy of scope for networks with fine-grain and subjective quality of service, i.e., QOS, requirements. QOS may be considered in terms of performance (e.g. throughput, delay) constraints, priority (e.g., establishment priority, retention priority) constraints, and resource (e.g. transmission medium, channel security) constraints. Network resources must be efficiently allocated to provide and guarantee a level of network QOS that matches the desired level of user QOS.

A request to establish a connection for supporting a call is issued with user-specified QOS constraints. These QOS constraints are translated into network-specific constraints for routing, which is a mechanism to determine an appropriate path in the network connecting a predetermined pair of end-users. The originator of the request is referred to as the source user, and the other end-user is referred to as the destination user. Resources are then allocated along this path to support the information transfer between the end-users. A network is abstractly represented by a collection of nodes that are connected by links. A node represents a switching system that is capable of originating, relaying, and receiving information. A link represents a transmission facility between a pair of nodes.

A performance constraint is a constraint on a directly perceivable measure of the quality of information transfer over a connection. It may be negotiable or non-negotiable among the network and the end-users. A negotiable performance constraint is specified in terms of a range of values bounded by a requested value and an acceptable value. A requested value is the most desirable performance level the user wish to have if resources are readily available. An acceptable value is the least desirable performance level the user would tolerate. A non-negotiable performance constraint is specified in terms of only an acceptable value.

A priority constraint is a condition imposed on the allocation of network resources to facilitate call preemption, the retrieval of network resources which have already been allocated to existing calls in order to accommodate new calls of greater importance. In the process, the existing calls are terminated prematurely. Priority constraints are implemented as link constraints that are dependent on connection states. Each call is assigned a set of priority numbers, each associated with a different connection state: establishment priority for the establishment state, re-establishment priority for the re-establishment state, and retention priority for the information transfer state. A preemption is permitted only when the priority of the preempting call is higher than the priority of the call to be preempted. The appropriate priority number used for comparison is the one that is associated with the connection state of the given call.

A resource constraint is a restriction on the use of a given type of network resource with a particular set of characteristics. In conventional routing, resource constraints determine whether a given resource is acceptable or not for routing a call. They are predetermined and do not depend on the status of the network. Each resource attribute (e.g., transmission medium) is associated with a set of possible discrete attribute values (e.g., satellite, microwave). A resource constraint is specified in terms of a subset of this set of attribute values. A network resource is not acceptable for carrying a connection unless each of its resource attribute values belongs to the corresponding resource constraint set. A routing topology is determined by availability and acceptability of links with various resource attribute values. In the past, resource attribute values were specified with binary (include/exclude) choices. Today, the user demands multi-level preferential specification of resource attribute values to support policy-oriented routing. The user may specify each attribute value of a resource attribute in terms of one of the following resource preferences.

REQUIRED: At most one attribute value from a given attribute set may be configured "required". When an attribute value is configured so, only resources characterized by this attribute value may be used.

PREFERRED: Resources characterized by attribute values configured "preferred" must be considered with priority over those characterized by attribute values configured otherwise, except for "required".

DON'T_CARE: Resources characterized by attribute values configured "don't$_{13}$ care" may be considered, in addition to any configured "preferred", only when no acceptable path can be found otherwise.

DON'T_USE: Resources characterized by attribute values configured "don't_use" must be avoided. At least one attribute value from a given attribute value set should be configured differently from "don't_use".

Figure 1:
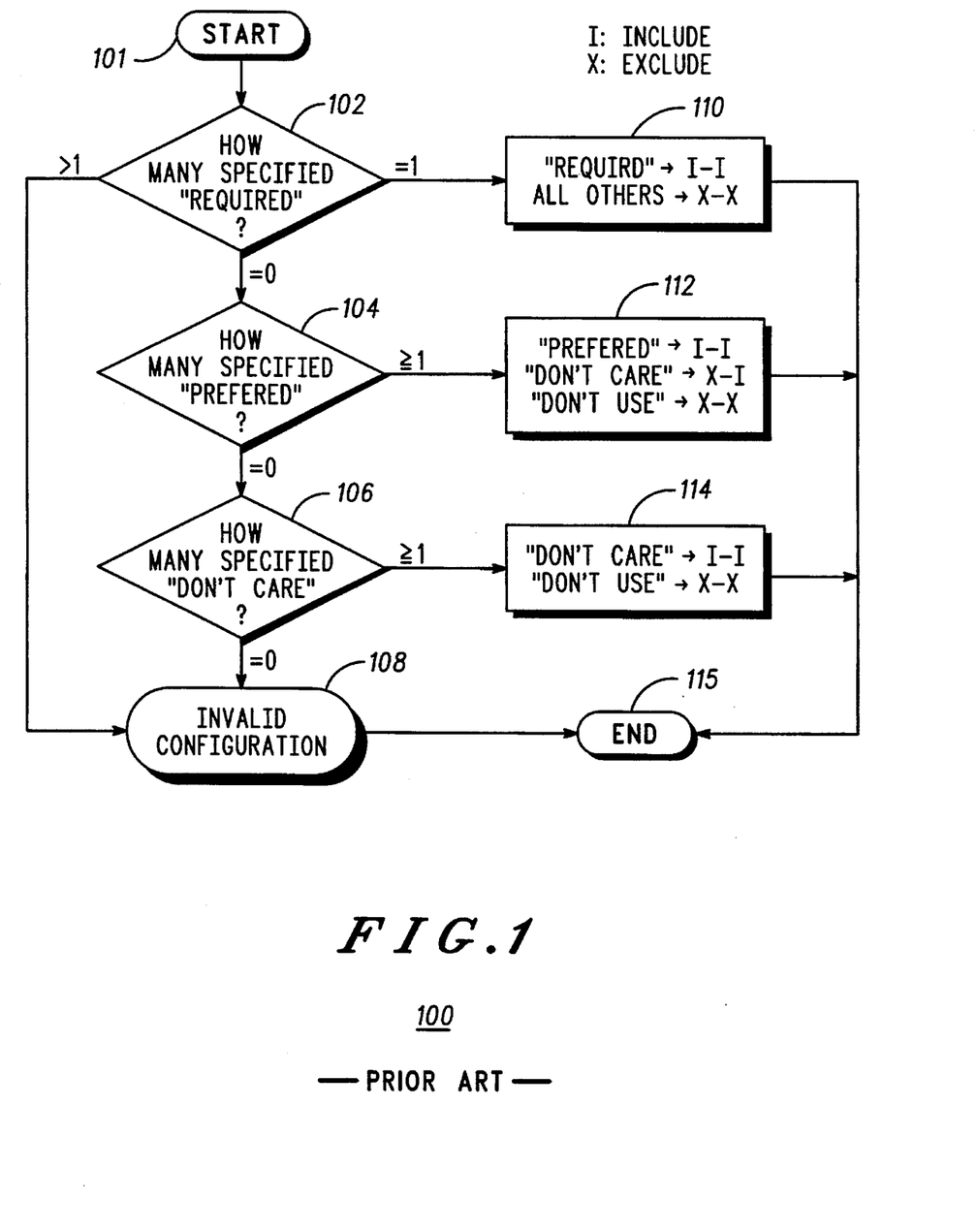
FIG. 1 shows steps for implementing a method using an algorithm for the translation of each resource attribute as is known in the art.

In one method for implementing preferential resource constraints, user preferences for resources are translated into two sets of resource constraints, namely "requested resource constraints" and "acceptable resource constraints". A network resource is not acceptable for a connection unless each of its resource attribute values belongs to the corresponding resource constraint set. Steps for implementing the method using the algorithm for the translation of each resource attribute are shown in FIG. 1, numeral 100. In FIG. 1, X-I assigned to an attribute value means that the given attribute value is excluded (represented by X) from the set of requested resource constraints, but included (represented by I) in the set of acceptable resource constraints. I-I and X-X are to be similarly interpreted. For each resource attribute, the resource translation algorithm sequentially checks the numbers of attribute values specified "required" (102), "preferred" (104), and "don't_care" (106). It detects an invalid configuration when there is more than one attribute value specified "required", or none specified other than "don't_use" (108). If there is only one attribute value specified "required", it assigns I-I to the attribute value, and X-X to all other attribute values for the same attribute (110). If none is specified "required", and one or more are specified "preferred", it assigns I-I to each specified "preferred", X-I to any specified "don't$_{13}$ care", and X-X to any specified "don't$_{13}$ use" (112). If none is specified "required", none is specified "preferred", and one or more are specified "don't_care", it assigns I-I to each specified "don't$_{13}$ care", and X-X to any specified "don't$_{13}$ use" (114). The algorithm ends either when an assignment is completed or when an invalid configuration is identified (115). An invalid configuration is a configuration wherein either more than one attribute value is specified "required" or all attribute value are specified "don't$_{13}$ use".

End-users in a network independently specify their QOS requirements in terms of various QOS constraints. QOS consolidation is the merging of possibly different QOS constraints of the end-users to produce consistent sets of QOS constraints that are used for path selection and connection management. A QOS consolidation function takes two constraint parameters of a kind, and produces another of the same kind. It does not affect the format, e.g., unit, of the QOS constraints.

In the prior art, the performance constraints of the end-users are often consolidated by taking the intersection of their agreeable ranges of performance values and letting the intersection be the new agreeable range. If the agreeable ranges of the end-users do not overlap, the call must be rejected. Although a non-negotiable performance constraint does not have a requested value, the agreeable range is well defined, and the consolidation is basically the same. The o priority constraints of the end-users are often consolidated by simply taking the higher of the two priority levels for each of the three priority types. This consolidation function preserves meeting the condition that the retention priority level must not be lower than any of the other two connection priority levels.

However, there has been no solution suggested for handling preferential resource constraints. Thus, a method and a device for consolidating resource constraints are needed to resolve the potential difference in the resource preferences of the end-users.

DETAILED DESCRIPTION OF A PREFERRED EMBODIMENT

Figure 2:
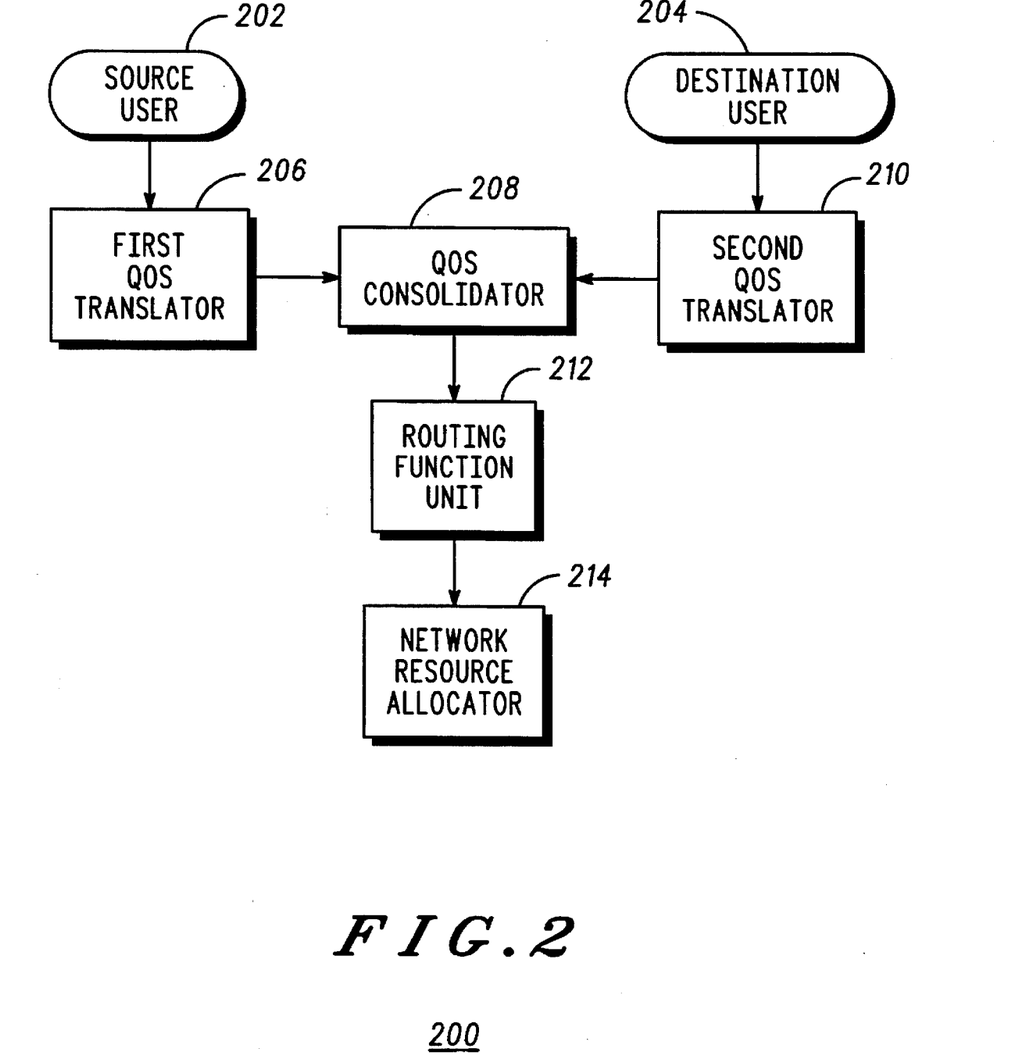
FIG. 2 is a block diagram of an implementation of a call-level QOS matching in accordance with the present invention.

FIG. 2, numeral 200, is a block diagram of an implementation of a call-level QOS matching in accordance with the present invention. The source user (202) and destination user (204) may specify their QOS requirements independently. The QOS requirements are translated into network-specific constraints that are used to determine the selection of an acceptable path for connection establishment. Path selection is executed by a routing function unit (212). When a path satisfying the consolidated QOS constraints is obtained, the network resource allocator (214) allocates resources along the path to establish a connection for supporting information transfer between the source and destination users. QOS requirements include preferential resource constraints which are translated by a QOS translator (206, 210) into a requested and an acceptable resource constraint sets. This invention provides a resource constraint merge scheme that is performed by a QOS consolidator (208), which consolidates the resource constraint sets derived from the QOS requirements specified by the source (202) and destination (204) users. The resource constraint merge scheme applied to the requested and acceptable resource constraint sets provides a new element that provides an efficient solution to the problem of consolidating preferential resource constraints and is particularly useful in consolidation of preferential resource constraints in asynchronous transfer mode, i.e., ATM, cell relay networks. In particular, local area network and wide area network applications in ATM cell relay networks with diverse quality of service requirements may utilize the present invention for efficient preferential resource constraint consolidation.

Figure 3:
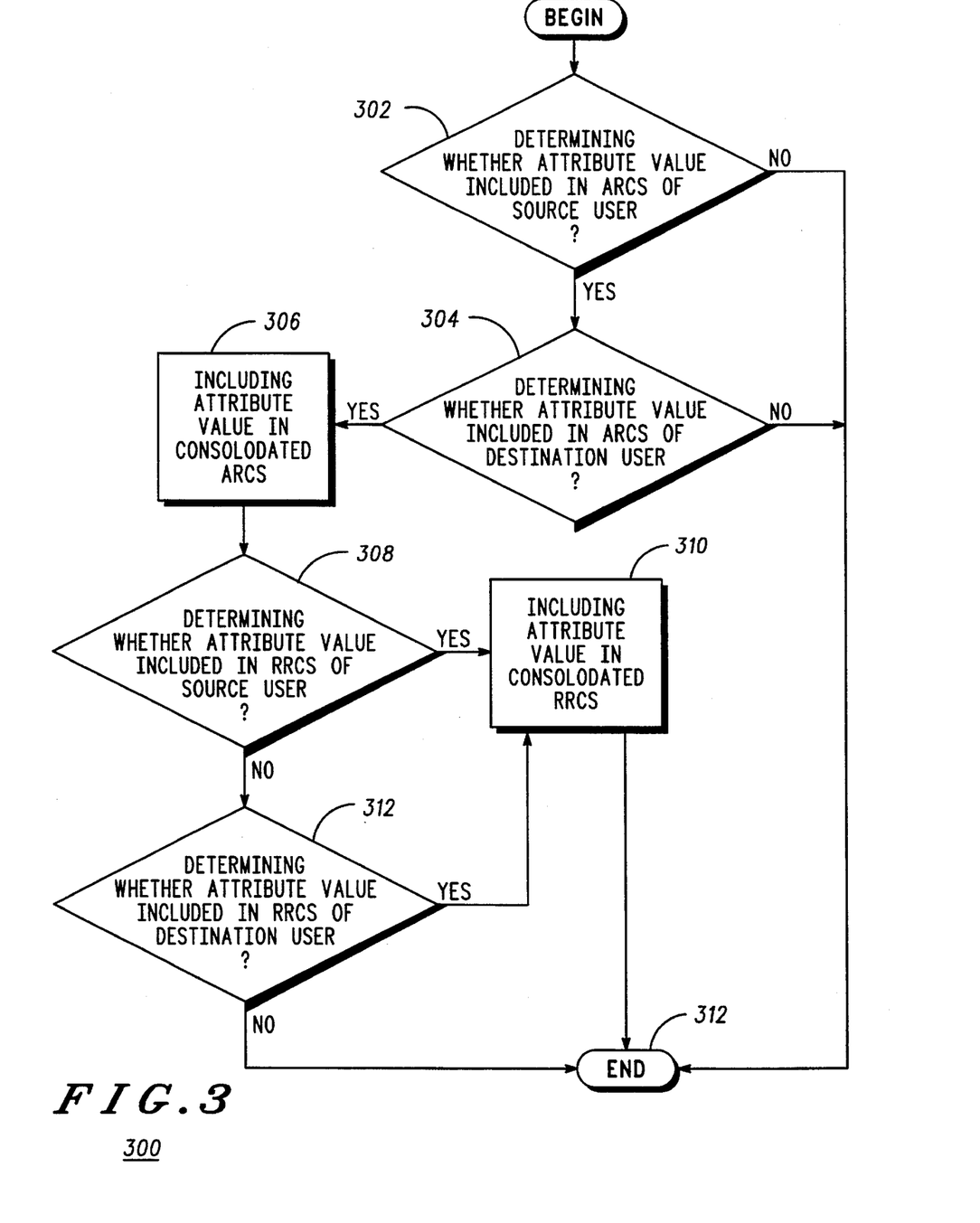
FIG. 3 is a flow chart showing the steps for one implementation of a method for utilizing a resource constraint merge scheme in accordance with the present invention.

The flow chart in FIG. 3, numeral 300, shows steps for one implementation of a method for utilizing a predetermined resource constraint merge scheme in accordance with the present invention. In FIG. 3, ARCS and RRCS denote "Acceptable Resource Constraint Set" and "Requested Resource Constraint Set" respectively. The merge scheme has properties as described below. A resource attribute value is included in the consolidated acceptable resource constraint set only if the resource attribute value is in both the acceptable resource constraint sets of the end-users. The resource attribute value is included in the consolidated requested resource constraint set if it is in the consolidated acceptable resource constraint set and in either of the requested resource constraint sets of the end-users. The predetermined resource constraint merge scheme, for both the device and method may be selected to include the steps of: A) determining whether an attribute value is included in the acceptable resource constraint set of the source user (302); B) where the attribute value is excluded from the acceptable resource constraint set of the source user, rejecting connection establishment and ending the scheme (312); C) where the attribute value is included in the acceptable resource constraint set of the source user, determining whether the attribute value is included in the acceptable resource constraint set of the destination user (304); D) where the attribute value is excluded from the acceptable resource constraint set of the destination user, rejecting connection establishment and ending the scheme (312); E) where the attribute value is included in the acceptable resource constraint set of the destination user, including the attribute value in a consolidated acceptable resource constraint set (306); F) determining whether the attribute value is included in the requested resource constraint set of the source user (308); G) where the attribute value is included in the requested resource constraint set of the source user, including the attribute value in a consolidated requested resource constraint set (310) and ending the scheme (312); H) where the attribute value is excluded from the requested resource constraint set of the source user, determining whether the attribute value is included in the requested resource constraint set of the destination user (312); I) where the attribute value is excluded from the requested resource constraint set of the destination user, ending the scheme (312); and J) where the attribute value is included in the requested resource constraint set of the destination user, including the attribute value in the consolidated requested resource constraint set (310) and ending the scheme (312).

The merge scheme can be implemented according to the mapping in Table 1. In Table 1, X-I assigned to an attribute value means that the given attribute value is excluded from the set of requested resource constraints, but included in the set of acceptable resource constraints. I-I and X-X are to be interpreted similarly. If the consolidated requested constraint set so derived is empty, it is replaced by the consolidated acceptable resource constraint set. A call must be rejected if both end-users do not have any resource attribute value commonly acceptable for at least one resource attribute.

TABLE 1

| Source Preference | Destination Preference | | |
|---|---|---|---|
| | X-X | X-I | I-I |
| X-X | X-X | X-X | X-X |
| X-I | X-X | X-I | I-I |
| I-I | X-X | I-I | I-I |

Figure 4:
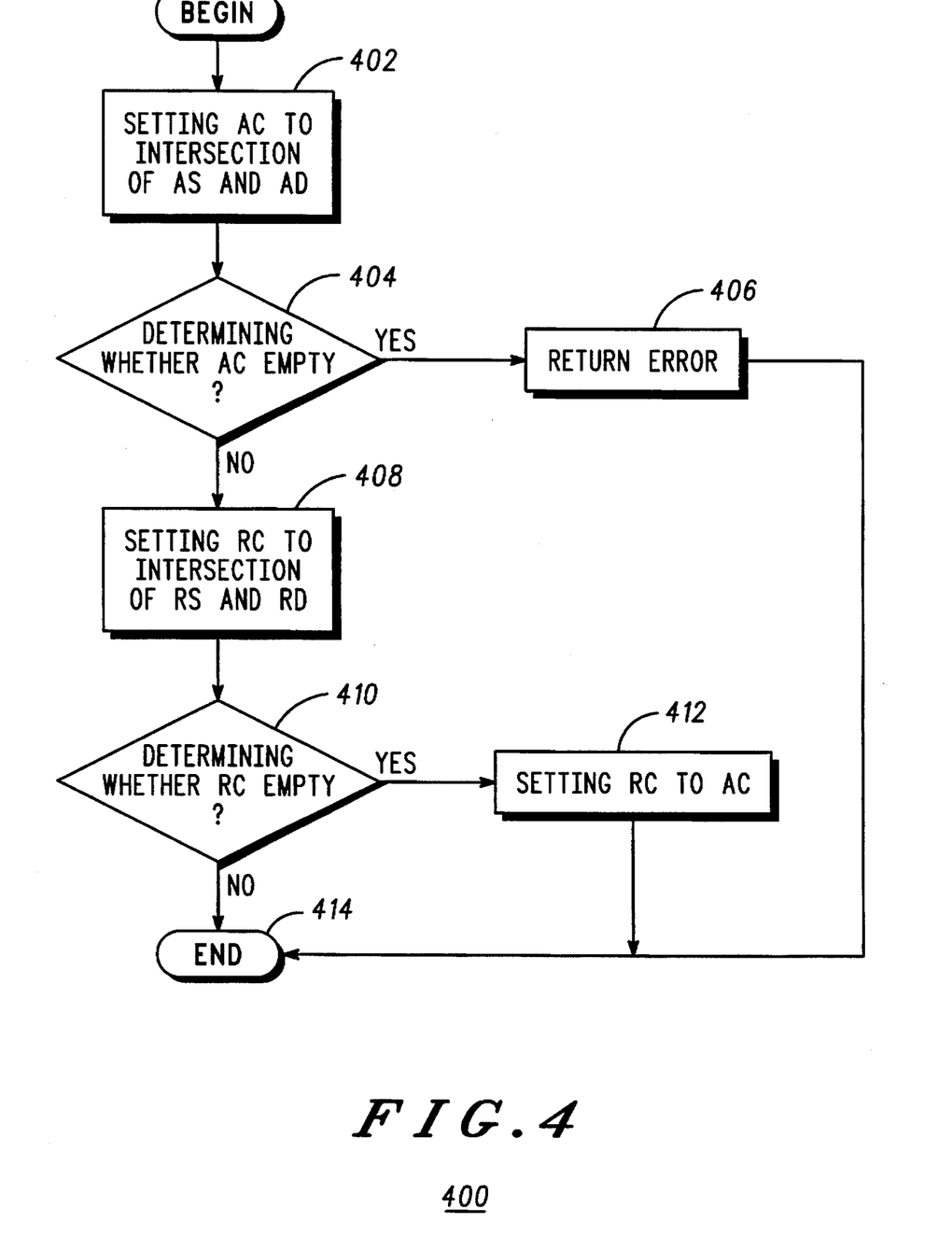
FIG. 4 is a flow chart showing the steps of the preferred embodiment of the method of the present invention wherein the resource constraint merge scheme is utilized.

FIG. 4, numeral 400, is a flow chart showing the steps of the preferred embodiment of the method of the present invention wherein the resource constraint merge scheme is utilized. In FIG. 4, As, Ad, and Ac denote the source user's acceptable resource constraint set, the destination user's acceptable resource constraint set, and the consolidated acceptable resource constraint set respectively, whereas Rs, Rd, and Rc denote the source user's requested resource constraint set, the destination user's requested resource constraint set, and the consolidated requested resource constraint set respectively. The embodiment in FIG. 4 applies to each resource attribute and provides for checking for invalid consolidated resource constraint sets. The steps of the preferred embodiment of the present invention for the predetermined resource constraint merge scheme in both the device and method may be selected to include: A) setting a consolidated acceptable resource constraint set to an intersection of the acceptable resource constraint set of the source user and the acceptable resource constraint set of the destination user (402); B) determining whether the consolidated acceptable resource constraint set is empty (404); C) where the consolidated acceptable resource constraint set is empty, sending an error message (406) and ending the scheme (414); D) where the consolidated acceptable resource constraint set has at least one resource attribute value, setting a consolidated requested constraint set to an intersection of the consolidated acceptable resource constraint set with a union of the requested resource constraint set of the source user and the requested resource constraint set of the destination user (408); E) determining whether the consolidated requested constraint set is empty (410); F) where the consolidated requested constraint set is empty, setting the consolidated requested constraint set to the consolidated acceptable constraint set (412) and ending the scheme (414) and G) where the consolidated requested constraint set has at least one resource attribute value, ending the scheme (414).

Figure 5:
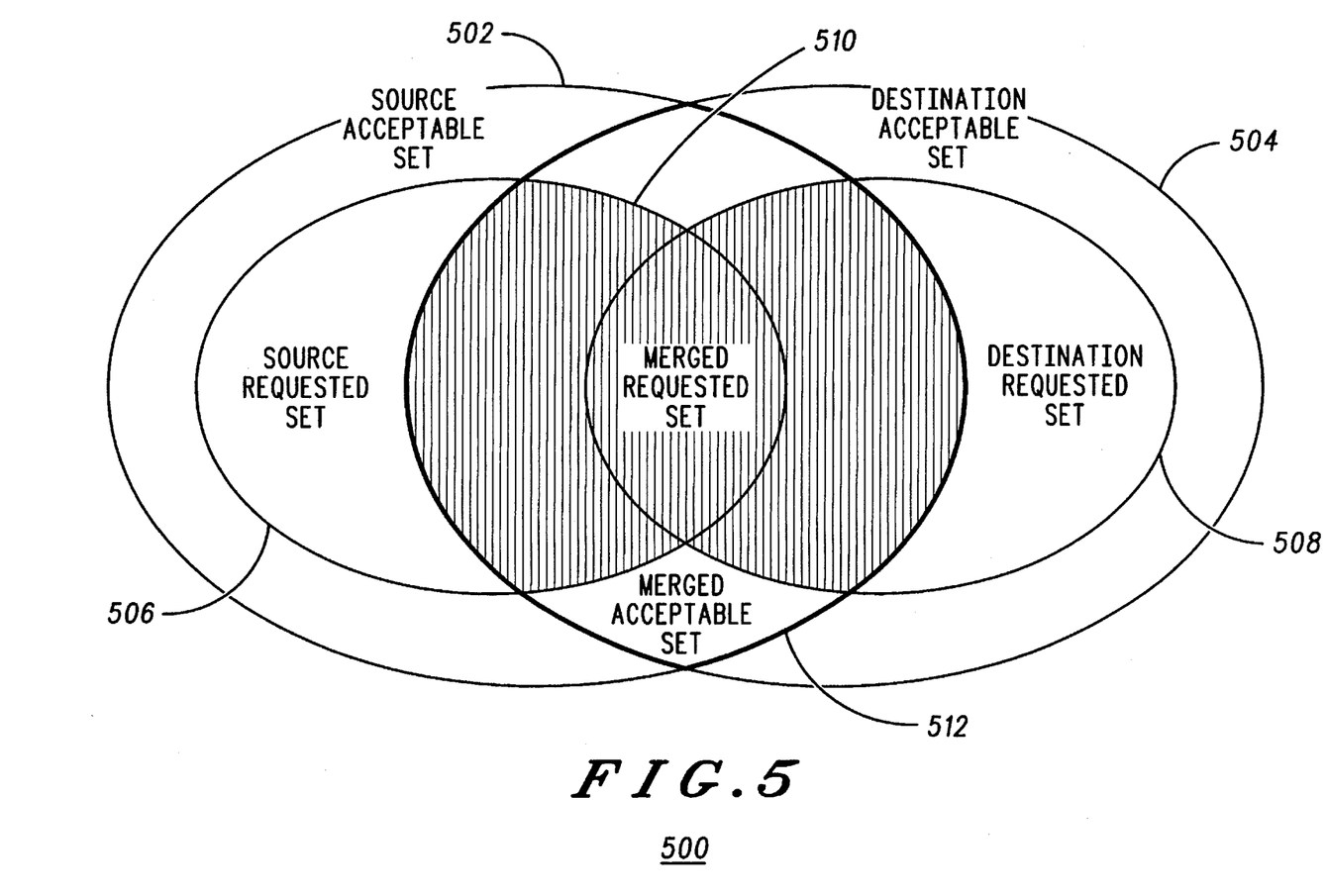
FIG. 5 is a schematic representation showing a typical merged requested set outcome of the consolidation of preferential resource constraints in accordance with the present invention.

FIG. 5, numeral 500, is a schematic representation showing a typical merged requested set outcome of the consolidation of preferential resource constraints in accordance with the present invention. The intersection of a source acceptable resource constraint set (502) and a destination acceptable resource constraint set (504) provides a merged, i.e., consolidated, acceptable resource constraint set (512). In a related fashion, the intersection of the merged acceptable resource constraint set (512) and the union of a source requested constraint set (506) and a destination requested constraint set (508) provides a consolidated requested resource constraint set (510).

Figure 6:
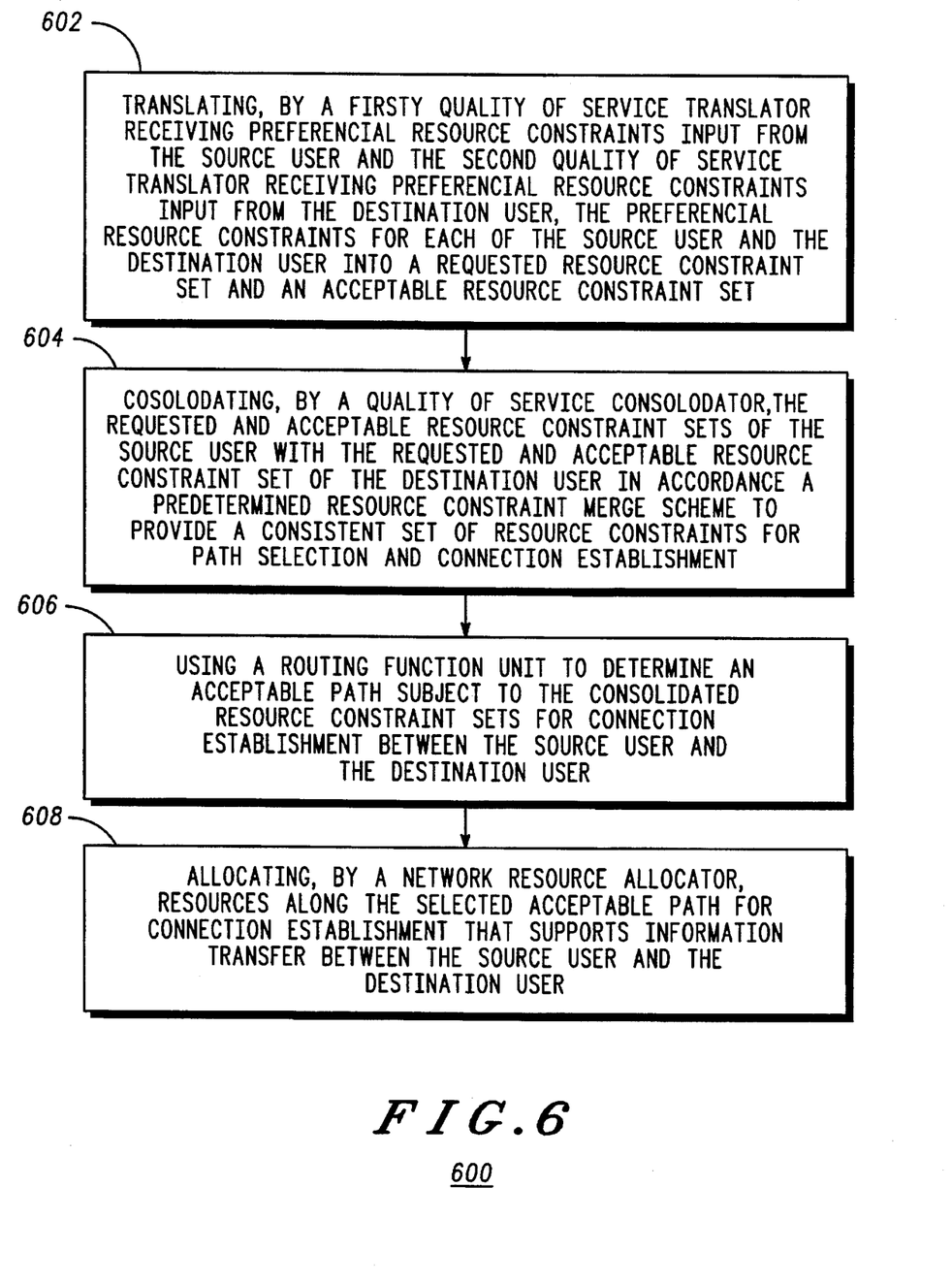
FIG. 6 is a flow chart of steps of one embodiment of the method for providing consolidation of preferential resource constraints specified by a source user and a destination user in a communication network in accordance with the present invention.

FIG. 6, numeral 600, is a flow chart of steps of one embodiment of the method for providing consolidation of preferential resource constraints specified by a source user and a destination user in a communication network in accordance with the present invention. The method includes the steps of: A) translating (602), by a first quality of service translator receiving preferential resource constraints input from the source user and the second quality of service translator receiving preferential resource constraints input from the destination user, the preferential resource constraints for each of the source user and the destination user into a requested resource constraint set and an acceptable resource constraint set; B) consolidating (604), by a quality of service consolidator, the requested and acceptable resource constraint sets of the source user with the requested and acceptable resource constraint sets of the destination user in accordance with a predetermined resource constraint merge scheme to provide a consistent set of resource constraints for path selection and connection establishment; C) using a routing function unit (606) to determine an acceptable path subject to the consolidated resource constraint sets for connection establishment between the source user and the destination user; and D) allocating (608), by a network resource allocator, resources along the selected acceptable path for connection establishment that supports information transfer between the source user and the destination user. As in the device described above for FIG. 2, the communication network is typically an asynchronous transfer mode cell relay network.

Figure 7:
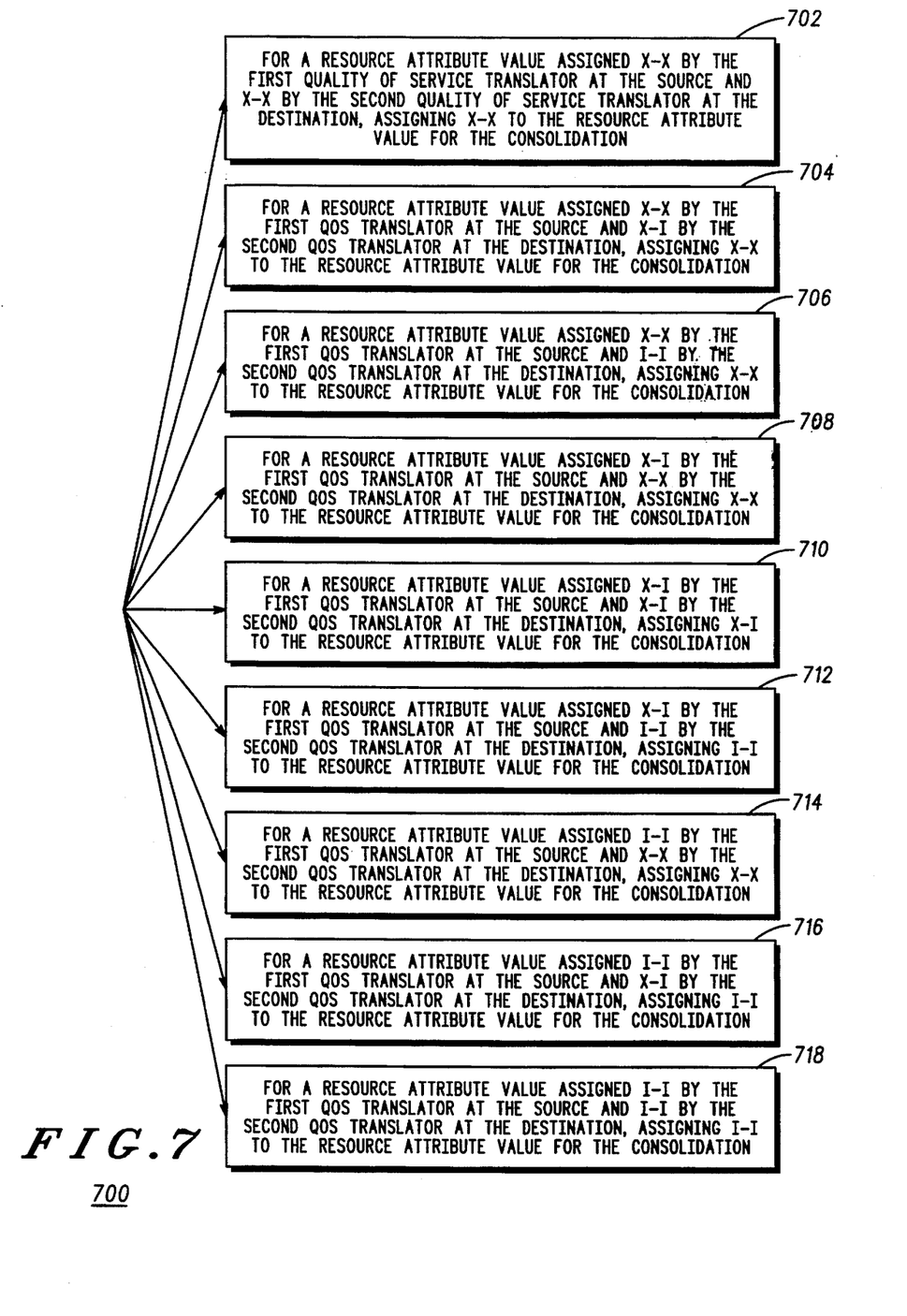
FIG. 7 shows one implementation of the predetermined resource constraint merge scheme steps in accordance with the present invention.

The predetermined resource constraint merge scheme generally includes: a) assigning a duplet X-I to an attribute value where X, in the first position of the duplet, represents that an attribute value is excluded from the requested resource constraint set and I, in the second position of the duplet, represents that the attribute value is included in the acceptable resource constraint set; b) assigning a duplet I-I to an attribute value where the first I in the duplet represents that the attribute value is included in the requested resource constraint set and the second I in the duplet represents that the attribute value is included in the acceptable resource constraint set; and c) assigning a duplet X-X to an attribute value where the first X in the duplet represents that the attribute value is excluded from the requested resource constraint set and the second X in the duplet represents that the attribute value is excluded from the acceptable resource constraint set, where a–c are performed in any selected order. Implementation of the predetermined resource constraint merge scheme in accordance with the present invention, shown in FIG. 7, numeral 700, may be selected to include: A) for a resource attribute value assigned X-X by the the first QOS translator at the source and X-X by the second QOS translator at the destination, assigning X-X to the resource attribute value for the consolidation (702); B) for a resource attribute value assigned X-X by the first QOS translator at the source and X-I by the second QOS translator at the destination, assigning X-X to the resource attribute value for the consolidation (704); C) for a resource attribute value assigned X-X by the first QOS translator at the source and I-I by the second QOS translator at the destination, assigning X-X to the resource attribute value for the consolidation (706); D) for a resource attribute value assigned X-I by the first QOS translator at the source and X-X by the second QOS translator at the destination, assigning X-X to the resource attribute value for the consolidation (708); E) for a resource attribute value assigned X-I by the first QOS translator at the source and X-I by the second QOS translator at the destination, assigning X-I to the resource attribute value for the consolidation (710); F) for a resource attribute value assigned X-I by the first QOS translator at the source and I-I by the second QOS translator at the destination, assigning I-I to the resource attribute value for the consolidation (712); G) for a resource attribute value assigned I-I by the first QOS translator at the source and X-X by the second QOS translator at the destination, assigning X-X to the resource attribute value for the consolidation (714); H) for a resource attribute value assigned I-I by the first QOS translator at the source and X-I by the second QOS translator at the destination, assigning I-I to the resource attribute value for the consolidation (716); and I) for a resource attribute value assigned I-I by the first QOS translator at the source and I-I by the second QOS translator at the destination, assigning I-I to the resource attribute value for the consolidation (718).

Where the requested resource constraint set formed by consolidation is empty, the requested resource constraint set is replaced by the acceptable resource constraint set formed by consolidation and where the set of resource attribute values commonly acceptable to both the source user and the destination user is an empty set, a connection establishment request is rejected.

Thus, the present invention includes a novel resource constraint merge scheme for consolidation of the requested and acceptable resource constraint sets to provide consistent sets of resource constraints for efficient path selection and connection establishment. Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A device for providing consolidation of preferential resource quality of service constraints specified by a source user and a destination user in a communication network, comprising:

A) a first quality of service translator, first QOS translator, being operably coupled to receive preferential resource constraints input from the source user, and a second quality of service translator, second QOS translator, being operably coupled to receive preferential resource constraints input from the destination user, wherein the quality of service translators are utilized for translating input quality of service requirements, for each of the source user and the destination user, into a requested resource constraint set and an acceptable resource constraint set, B) a quality of service consolidator, operably coupled to the first quality of service translator and the second quality of service translator, for consolidating the requested and acceptable resource constraint sets of the source user with the requested and acceptable resource constraint set of the destination user in accordance with a predetermined resource constraint merge scheme to provide appropriate resource constraints for path selection and connection establishment, C) a routing function unit, operably coupled to the quality of service consolidator, for selecting an acceptable path for connection establishment between the source user and the destination user, and D) a network resource allocator, operably coupled to the routing function unit, for allocating resources along the selected acceptable path for connection establishment that supports information transfer between the source user and the destination user.

2. The device of claim 1 wherein the communication network is an asynchronous transfer mode cell relay network.

3. The device of claim 1 wherein the predetermined resource constraint merge scheme includes:

assigning a duplet X-I to an attribute value where X in the first position of the duplet represents that an attribute value is excluded from the requested resource constraint set and I in the second position of the duplet represents that the attribute value is included in the acceptable resource constraint set, assigning a duplet I-I to an attribute value where the first I in the duplet represents that the attribute value is included in the requested resource constraint set and the second I in the duplet represents that the attribute value is included in the acceptable resource constraint set, and assigning a duplet X-X to an attribute value where the first X in the duplet represents that the attribute value is excluded from the requested resource constraint set and the second X in the duplet represents that the attribute value is excluded from the acceptable resource constraint set, and implementation of the predetermined resource constraint merge scheme includes:

A) for a resource attribute value assigned X-X by the first quality of service translator at the source and X-X by the second quality of service translator at the destination, assigning X-X to the resource attribute value for the consolidation, B) for a resource attribute value assigned X-X by the first QOS translator at the source and X-I by the second QOS translator at the destination, assigning X-X to the resource attribute value for the consolidation, C) for a resource attribute value assigned X-X by the first QOS translator at the source and I-I by the second QOS translator at the destination, assigning X-X to the resource attribute value for the consolidation, D) for a resource attribute value assigned X-I by the first QOS translator at the source and X-X by the second QOS translator at the destination, assigning X-X to the resource attribute value for the consolidation, E) for a resource attribute value assigned X-I by the first QOS translator at the source and X-I by the second QOS translator at the destination, assigning X-I to the resource attribute value for the consolidation, F) for a resource attribute value assigned X-I by the first QOS translator at the source and I-I by the second QOS translator at the destination, assigning I-I to the resource attribute value for the consolidation, G) for a resource attribute value assigned I-I by the first QOS translator at the source and X-X by the second QOS translator at the destination, assigning X-X to the resource attribute value for the consolidation, H) for a resource attribute value assigned I-I by the first QOS translator at the source and X-I by the second QOS translator at the destination, assigning I-I to the resource attribute value for the consolidation, and I) for a resource attribute value assigned I-I by the first QOS translator at the source and I-I by the second QOS translator at the destination, assigning I-I to the resource attribute value for the consolidation, and wherein, where the requested constraint set formed by consolidation is empty, the requested resource constraint set is replaced by the acceptable resource constraint set formed by consolidation and wherein, where the set of resource attribute values commonly acceptable to both the source user and the destination user is an empty set, a connection establishment request is rejected.

4. The device of claim 1 wherein the predetermined resource constraint merge scheme includes:

A) determining whether an attribute value is included in the acceptable resource constraint set of the source user, B) where the attribute value is excluded from the acceptable resource constraint set of the source user, rejecting connection establishment and ending the scheme, C) where the attribute value is included in the acceptable resource constraint set of the source user, determining whether the attribute value is included in the acceptable resource constraint set of the destination user, D) where the attribute value is excluded from the acceptable resource constraint set of the destination user, rejecting connection establishment and ending the scheme, E) where the attribute value is included in the acceptable resource constraint set of the destination user, including the attribute value in a consolidated acceptable resource constraint set, F) determining whether the attribute value is included in the requested resource constraint set of the source user, G) where the attribute value is included in the requested resource constraint set of the source user, including the attribute value in a consolidated requested resource constraint set and ending the scheme, H) where the attribute value is excluded from the requested resource constraint set of the source user, determining whether the attribute value is included in the requested resource constraint set of the destination user, I) where the attribute value is excluded from the requested resource constraint set of the destination user, ending the scheme, and J) where the attribute value is included in the requested resource constraint set of the destination user, including the attribute value in the consolidated requested resource constraint set and ending the scheme.

5. The device of claim 1 wherein the predetermined resource constraint merge scheme includes:

A) setting a consolidated acceptable resource constraint set to an intersection of the acceptable resource constraint set of the source user and the acceptable resource constraint set of the destination user, B) determining whether the consolidated acceptable resource constraint set is empty, C) where the consolidated acceptable resource constraint set is empty, sending an error message and ending the scheme, D) where the consolidated acceptable resource constraint set has at least one resource attribute value, setting a consolidated requested constraint set to an intersection of the consolidated acceptable resource constraint set with a union of the requested resource constraint set of the source user and the requested resource constraint set of the destination user, E) determining whether the consolidated requested constraint set is empty, F) where the consolidated requested constraint set is empty, setting the consolidated requested constraint set to the consolidated acceptable constraint set and ending the scheme, and G) where the consolidated requested constraint set has at least one resource attribute value, ending the scheme.

6. A method for providing consolidation of preferential resource quality of service constraints specified by a source user and a destination user in a communication network, comprising the steps of:

A) translating, by a first quality of service translator, first QOS translator, receiving preferential resource constraints input from the source user and a second quality of service translator, second QOS translator, receiving preferential resource constraints input from the destination user, the preferential resource constraints for each of the source user and the destination user into a requested resource constraint set and an acceptable resource constraint set, B) consolidating, by a quality of service consolidator, the requested and acceptable resource constraint sets of the source user with the requested and acceptable resource constraint sets of the destination user in accordance with a predetermined resource constraint merge scheme to provide a consistent set of consolidated resource constraints for path selection and connection establishment, C) using a routing function unit to determine an acceptable path subject to the set of consolidated resource constraints, and D) allocating, by a network resource allocator, resources along the selected acceptable path for connection establishment that supports information transfer between the source user and the destination user.

7. The method of claim 6 wherein the communication network is an asynchronous transfer mode cell relay network.

8. The method of claim 6 wherein the predetermined resource constraint merge scheme includes:

assigning X-I to an attribute value where X represents that an attribute value is excluded from the requested resource constraint set and I represents that the attribute value is included in the acceptable resource constraint set, assigning I-I to an attribute value where a first I represents that the attribute value is included in the requested resource constraint set and a second I represents that the attribute value is included in the acceptable resource constraint set, and assigning X-X to an attribute value where a first X represents that the attribute value is excluded from the requested resource constraint set and a second X represents that the attribute value is excluded from the acceptable resource constraint set, and implementation of the predetermined resource constraint merge scheme includes:

A) for a resource attribute value assigned X-X by the first quality of service translator at the source and X-X by the second quality of service translator at the destination, assigning X-X to the resource attribute value for the consolidation, B) for a resource attribute value assigned X-X by the first QOS translator at the source and X-I by the second QOS translator at the destination, assigning X-X to the resource attribute value for the consolidation, C) for a resource attribute value assigned X-X by the first QOS translator at the source and I-I by the second QOS translator at the destination, assigning X-X to the resource attribute value for the consolidation, D) for a resource attribute value assigned X-I by the first QOS translator at the source and X-X by the second QOS translator at the destination, assigning X-X to the resource attribute value for the consolidation, E) for a resource attribute value assigned X-I by the first QOS translator at the source and X-I by the second QOS translator at the destination, assigning X-I to the resource attribute value for the consolidation, F) for a resource attribute value assigned X-I by the first QOS translator at the source and I-I by the second QOS translator at the destination, assigning I-I to the resource attribute value for the consolidation, G) for a resource attribute value assigned I-I by the first QOS translator at the source and X-X by the second QOS translator at the destination, assigning X-X to the resource attribute value for the consolidation, H) for a resource attribute value assigned I-I by the first QOS translator at the source and X-I by the second QOS translator at the destination, assigning I-I to the resource attribute value for the consolidation, and I) for a resource attribute value assigned I-I by the first QOS translator at the source and I-I by the second QOS translator at the destination, assigning I-I to the resource attribute value for the consolidation, and wherein, where the requested constraint set formed by consolidation is empty, the requested resource constraint set is replaced by the acceptable resource constraint set formed by consolidation and wherein, where the set of resource attribute values commonly acceptable to both the source user and the destination user is an empty set, a connection establishment request is rejected.

9. The method of claim 6 wherein the predetermined resource constraint merge scheme includes:

A) determining whether an attribute value is included in the acceptable resource constraint set of the source user, B) where the attribute value is excluded from the acceptable resource constraint set of the source user, rejecting connection establishment and ending the scheme, C) where the attribute value is included in the acceptable resource constraint set of the source user, determining whether the attribute value is included in the acceptable resource constraint set of the destination user, D) where the attribute value is excluded from the acceptable resource constraint set of the destination user, rejecting connection establishment and ending the scheme, E) where the attribute value is included in the acceptable resource constraint set of the destination user, including the attribute value in a consolidated acceptable resource constraint set, F) determining whether the attribute value is included in the requested resource constraint set of the source user, G) where the attribute value is included in the requested resource constraint set of the source user, including the attribute value in a consolidated requested resource constraint set and ending the scheme, H) where the attribute value is excluded from the requested resource constraint set of the source user, determining whether the attribute value is included in the requested resource constraint set of the destination user, I) where the attribute value is excluded from the requested resource constraint set of the destination user, ending the scheme, and J) where the attribute value is included in the requested resource constraint set of the destination user, including the attribute value in the consolidated requested resource constraint set and ending the scheme.

10. The method of claim 6 wherein the predetermined resource constraint merge scheme includes:

A) setting a consolidated acceptable resource constraint set to an intersection of the acceptable resource constraint of the source user and the acceptable resource constraint of the destination user, B) determining whether the consolidated acceptable resource constraint set is empty, C) where the consolidated acceptable resource constraint set is empty, sending an error message and ending the scheme, D) where the consolidated acceptable resource constraint set has at least one resource attribute value, setting a consolidated requested constraint set to an intersection of the consolidated acceptable resource constraint set with a union of the requested resource constraint set of the source user and the requested resource constraint set of the destination user, E) determining whether the consolidated requested constraint set is empty, F) where the consolidated requested constraint set is empty, setting the consolidated requested constraint set to the consolidated acceptable constraint set and ending the scheme, and G) where the consolidated requested constraint set has at least one resource attribute value, ending the scheme.

* * * * *